Feb. 17, 1925.                                                        1,526,600
                          H. HOFFMEISTER
                       CALCULATING MACHINE
                       Filed March 6, 1924
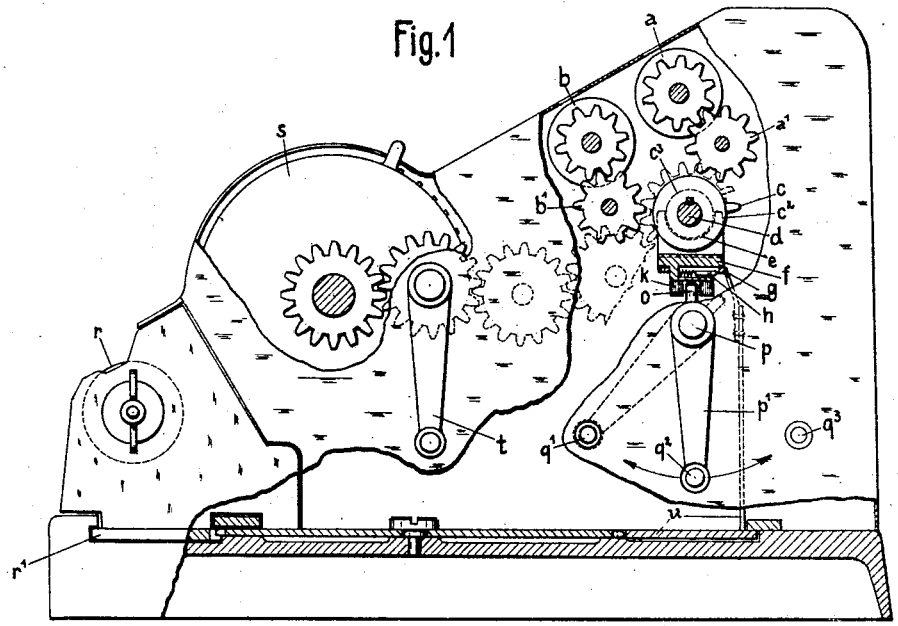
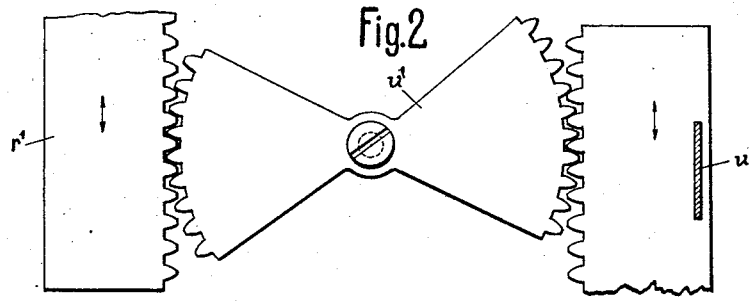
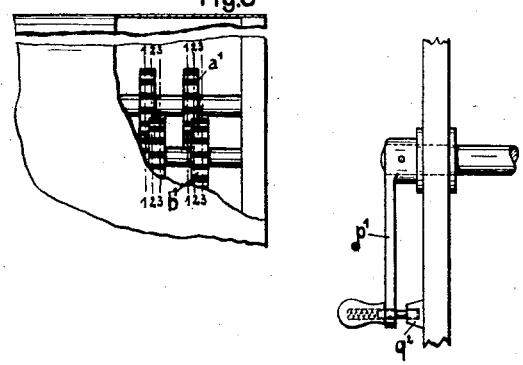
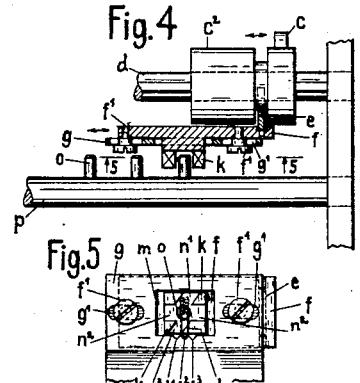
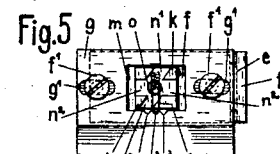
*Inventor:*
Dr.-Ing. Hermann Hoffmeister
by     Die Patentanwälte
    C. Arndt u. Dr.-Ing. Bock
durch:
                    *Attorney*

Patented Feb. 17, 1925.

1,526,600

UNITED STATES PATENT OFFICE.

HERMANN HOFFMEISTER, OF GLIESMARODE, NEAR BRUNSWICK, GERMANY, ASSIGNOR TO GRIMME, NATALIS & CO., AKTIENGESELLSCHAFT, BRAUNSCHWEIG, GERMANY, A CORPORATION OF GERMANY.

CALCULATING MACHINE.

Application filed March 6, 1924. Serial No. 697,423.

*To all whom it may concern:*

Be it known that I, HERMANN HOFFMEISTER, a citizen of Germany, residing at Gliesmarode, near Brunswick, Germany, have invented certain new and useful Improvements in Calculating Machines (for which I have filed applications in Germany, March 12, 1923; Austria, February 7, 1924; Sweden, February 13, 1924), of which the following is a specification.

My invention relates to improvements in calculating machines, and more particularly in calculating machines of the type provided with two revolutions counting mechanisms adapted to be operated by the same single tooth wheel or other driving member. The object of the improvements is to provide a machine of this type in which the driving member is adapted either for simultaneous driving engagement with both revolutions counting mechanisms, or with either one of them. With this object in view I dispose the gears of corresponding numeral wheels of the revolutions counting mechanisms approximately in the same planes, but so as to be displaced with relation to each other in axial direction a distance less than the breadth of the gears so that the gears are in the same planes only with a portion of their breadth, and that they project beyond each other at opposite sides. The single tooth wheel is mounted on its axis so as to be axially shiftable thereon from the median position in which it is in engagement with both gears in one or the other direction and so far that it is in position for engagement with one or the other gear.

For the purpose of explaining the invention an example embodying the same has been shown in the accompanying drawings in which the same reference characters have been used in all the views to indicate corresponding parts. In said drawings, Fig. 1, is a sectional elevation showing my improved apparatus, Fig. 2, is a plan view showing a detail, Fig. 3, is an elevation showing the relative position of corresponding gears of the revolutions counting mechanism, Fig. 4, is a detail view partly in section showing the single tooth wheel and the means for shifting the same in axial direction relatively to the shifting member connected with the carriage of the registering mechanism, and Fig. 5, is a bottom view showing a part of the shifting means of the single tooth wheel looking in the direction of the arrows 5, 5 shown in Fig. 4.

In the figures I have shown a calculating machine comprising, a setting mechanism, a registering mechanism $r$ mounted on a carriage $r^1$ and shiftable in a direction parallel to the setting mechanism, a machine crank $t$ adapted to impart rotary movement to the setting mechanism for transmitting the values set thereon to the registering mechanism, and to a shaft $d$ having the single tooth wheel $c^2$ axially shiftable and non-rotatable thereon, as is known in the art. The single tooth wheel $c^2$ cooperates with two revolutions counting mechanisms the numeral wheels $a$ and $b$ of which are adapted to be rotated by gears $a^1$ and $b^1$ located in position for engagement by the single tooth $c$. The single tooth wheel shows a circumferential groove $c^3$ engaged by a segment $e$ operatively connected with the carriage of the registering mechanism for being shifted thereby axially of the revolutions counting mechanisms for successively engaging the numeral wheels of the different orders of the revolutions counting mechanisms. As appears from Fig. 3, the gears $a^1$ and $b^1$ of corresponding numeral wheels are disposed approximately within the same plane and they are displaced with relation to each other a distance less than their breadth, so that parts of the gears are within the same plane while the other parts project axially beyond said plane. The single tooth $c$ is adapted to be shifted relatively to the gears $a^1$ and $b^1$ from the median position indicated in Fig. 3 by the broken line 2 to the right or left and into the positions indicated by the broken lines 1 and 3, and when the single tooth $c$ is in the position 1 it is adapted to engage only the gear $a^1$, when it is in the position 2 it is adapted for engagement with both gears $a^1$ and $b^1$, and when in the position 3 it is adapted to engage only the gear $b^1$.

For thus shifting the single tooth wheel relatively to the slide $r^1$ the following means are provided. The segment $e$ is secured to the plate $f$ mounted on a plate $g$ and guided thereon by means of a pair of screws $f^1$ secured to the plate $f$ and passing through slots $g^1$, the plate $g$ being rigidly connected with the carriage $r^1$ through the intermediary of rods $u$ and a lever $u^1$. The plate $f$ is provided with a spring pressed locking bolt $h$ the wedge shaped end of which is adapted for locking engagement with either one of three notches $i^1$, $i^2$, $i^3$ made in the plate $g$. The plate $f$ is formed with a block $k$ projecting downwardly therefrom and through a hole $m$ of the plate $g$ and formed at its bottom side with an axial slot $n^2$ and two beveled transverse slots $n^1$ and $n^3$. Below the shaft $d$ there is a rock shaft $p$ carrying pins $o$ and a hand crank $p^1$, the latter being adapted to be fixed in either one of three positions $q^1$, $q^2$, $q^3$ by a hand crank $p^1$, and the pins $o$ being in position for engagement with the beveled slots $n^1$ and $n^3$, as will be understood from Fig. 5.

In the median position $q^2$ of the hand crank shown in Fig. 1 the spring pressed bolt $h$ engages in the median notch $i^2$, and the single tooth $c$ is in the median position represented in Fig. 3 by the line 2 in which it is adapted to act on both revolutions counting mechanisms $a$ and $b$. The pins $o$ of the shaft $p$ are in line with the axial slot $n^3$ of the block $k$, so that the single tooth $c$ can be shifted in axial direction when shifting the carriage $r^1$.

When rocking the crank $p^1$ into the position $q^1$ the pin $o$ disposed below the plate $f$ passes through the beveled transverse slot $n^1$ and into the position shown in Fig. 1 in dotted lines. Thereby the plate $f$ and the single tooth $c$ are shifted into the position represented in Fig. 3 by the line 1, so that only the revolutions counting mechanism $a$ is operated.

When rocking the crank $p^1$ into the position $q^3$ a similar operation is performed and the single tooth $c$ is set into position for cooperation with the revolutions counting mechanism $b$.

If it is desired to have both revolutions counting mechanisms in operation, the crank $p^1$ is again rocked into the median position $q^2$. Thereby the single tooth $c$ is again brought into the position 2, because the corresponding pin $o$ passes through the beveled transverse slot $n^1$ or $n^3$ and returns the block $k$ into median position in which it is locked by the bolt $h$ engaging in the notch $i^2$. The single tooth can be shifted in the manner described in any position of the plate $g$ and the carriage $r^1$, because for each order of the revolutions counting mechanism $a$ pin $o$ is provided.

From the foregoing description it will be understood that for throwing either one of the revolutions counting mechanisms out of operation the single tooth wheel and the revolutions counting mechanisms are shifted relatively to each other in axial direction, and as shown herein the single tooth is shiftable while the revolutions counting mechanisms are stationary. But I wish it to be understood that I do not limit myself to a construction in which the single tooth wheel is shiftable.

I claim:

1. In a calculating machine, the combination, with the shiftable registering mechanism, of an operating member movable therewith, and two revolutions counting mechanisms having corresponding gears of the numeral wheels displaced with relation to each other in axial direction so far that said operating member is adapted to cooperate either simultaneously with both gears, or with only one of them, and means for shifting the revolutions counting mechanisms and operating member so far that the operating member is adapted for cooperation either with both gears or with one of them.

2. In a calculating machine, the combination, with a shiftable registering mechanism, an operating member, and means intermediate said registering mechanism and operating member for shifting the operating member in axial direction, of two revolutions counting mechanisms having corresponding gears displaced with relation to each other in axial direction so far that the operating member is adapted for cooperation either with both gears or with one of them only, means for axially shifting the operating member relatively to said intermediate means, and means for locking the operating member in its positions.

3. In a calculating machine, the combination, with a shiftable registering mechanism, an operating member, means intermediate said registering mechanism and operating member for shifting the operating member in axial direction, said means comprising an axially shiftable plate, a member secured to said plate and engaging the operating member for axially shifting the same, and means for locking said plate in position on the intermediate means, of two revolutions counting mechanisms having corresponding gears displaced with relation to each other in axial direction so far that the operating member is adapted for cooperation either with both gears or with one of them only.

4. In a calculating machine, the combination, with a shiftable registering mechanism, an operating member, means intermediate said registering mechanism and operating member for shifting the operating member in axial direction, said means comprising an axially shiftable plate formed with a cam face, a member secured to said plate and engaging the operating member for axially shifting the same, a hand operated member adapted for engagement with said cam face for axially shifting said plate, and means for locking said plate in position on the intermediate means, of two revolutions counting mechanisms having corresponding gears displaced with relation to each other in axial direction so far that the operating member is adapted for cooperation either with both gears or with one of them only.

5. In a calculating machine, the combination, with a shiftable registering mechanism, an operating member, means intermediate said registering mechanism and operating member for shifting the operating member in axial direction, said means comprising an axially shiftable plate formed with a cam face, a member secured to said plate and engaging the operating member for axially shifting the same, hand operated members one for each order of the revolutions counting mechanisms adapted for engagement with said cam face for axially shifting said plate, and means for locking said plate in position on the intermediate means, of two revolutions counting mechanisms having corresponding gears displaced with relation to each other in axial direction so far that the operating member is adapted for cooperation either with both gears or with one of them only.

6. In a calculating machine, the combination, with a shiftable registering mechanism, an operating member, means intermediate said registering mechanism and operating member for shifting the operating member in axial direction, said means comprising an axially shiftable plate formed with a cam face, a member secured to said plate and engaging the operating member for axially shifting the same, members one for each order of the revolutions counting mechanisms mounted on a common hand operated rock shaft and adapted for engagement with said cam face for axially shifting said plate, and means for locking said plate in position on the intermediate means, of two revolutions counting mechanisms having corresponding gears displaced with relation to each other in axial direction so far that the operating member is adapted for cooperation either with both gears or with one of them only.

7. In a calculating machine, the combination, with a shiftable registering mechanism, an operating member, means intermediate said registering mechanism and operating member for shifting the operating member in axial direction, said means comprising an axially shiftable plate formed with a cam face, a member secured to said plate and engaging the operating member for axially shifting the same, members one for each order of the revolutions counting mechanisms mounted on a common hand operated rock shaft and adapted for engagement with said cam face for axially shifting said plate, said plate being formed with an axial recess in line with said members, and means for locking said plate in position on the intermediate means, of two revolutions counting mechanisms having corresponding gears displaced with relation to each other in axial direction so far that the operating member is adapted for cooperation either with both gears or with one of them only.

In testimony whereof I have hereunto set my hand.

Dr. Ing. HERMANN HOFFMEISTER.